(No Model.) 2 Sheets—Sheet 1.
A. LINDGREN.
COMBINED PLOW AND PLANTER.
No. 374,415. Patented Dec. 6, 1887.
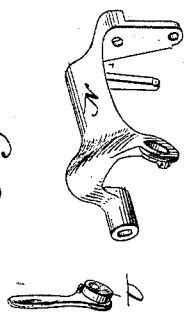
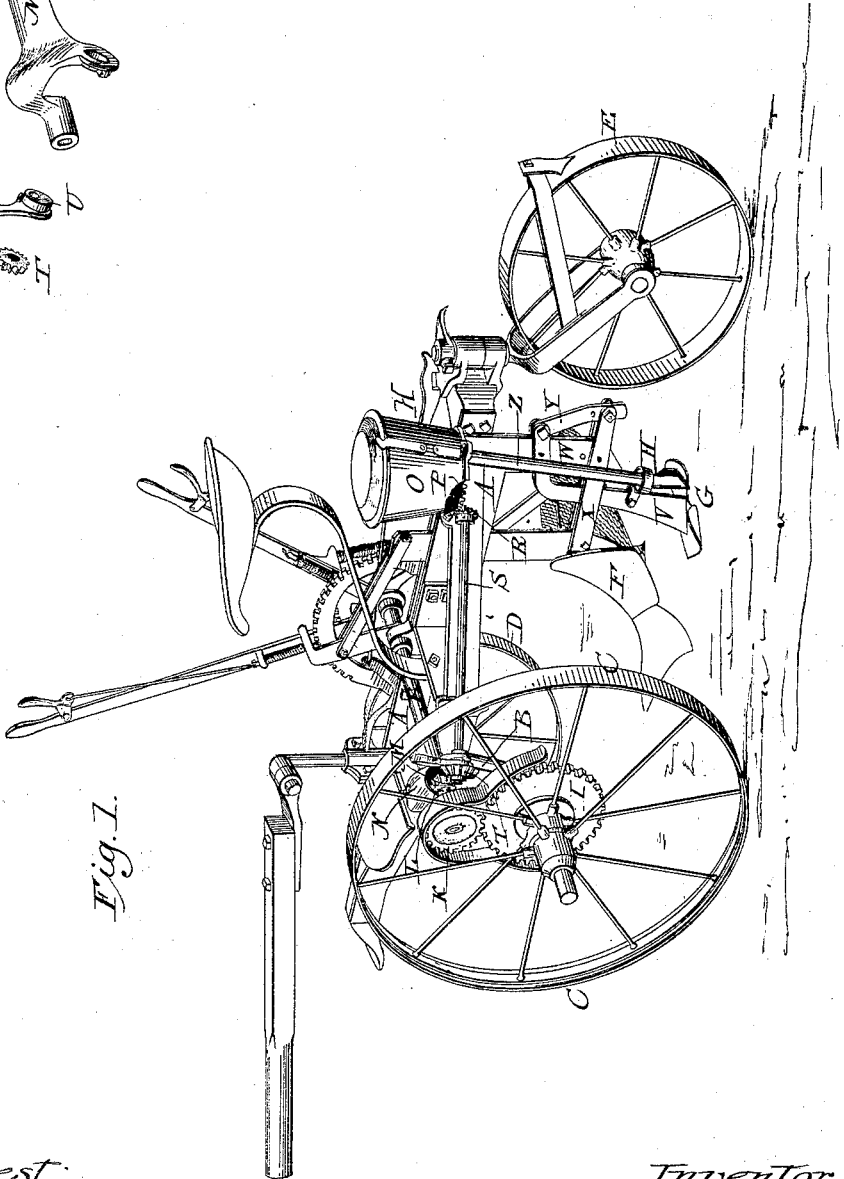
Attest:
Sidney P. Hollingsworth
W. R. Kennedy
Inventor.
August Lindgren
By his Atty
Phil. T. Dodge

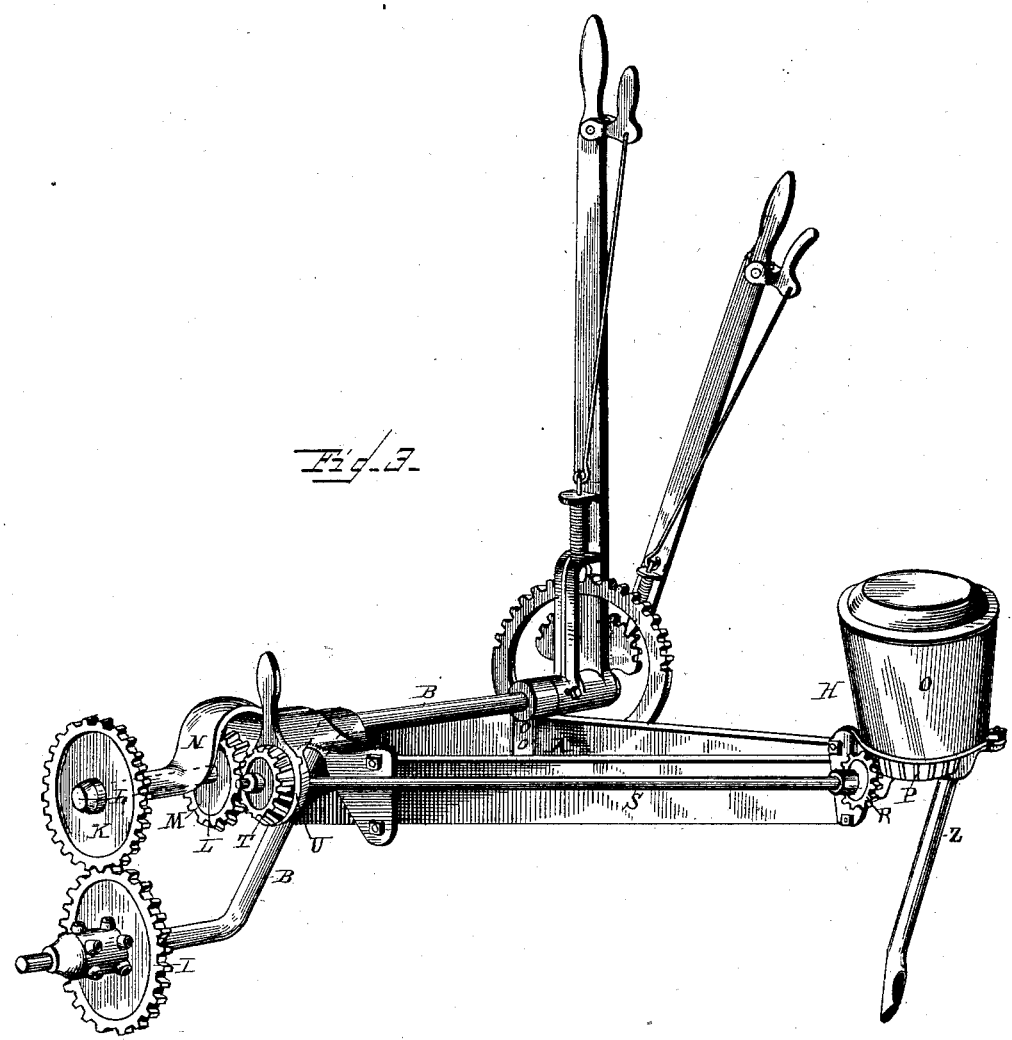

United States Patent Office.

AUGUST LINDGREN, OF MOLINE, ILLINOIS, ASSIGNOR TO THE MOLINE PLOW COMPANY, OF SAME PLACE.

COMBINED PLOW AND PLANTER.

SPECIFICATION forming part of Letters Patent No. 374,415, dated December 6, 1887.

Application filed August 31, 1887. Serial No. 248,381. (No model.)

*To all whom it may concern:*

Be it known that I, AUGUST LINDGREN, of Moline, in the county of Rock Island and State of Illinois, have invented certain Improvements in Combined Plows and Planters, of which the following is a specification.

This invention relates to that class of machines in which a lister-plow and a planter or drill are combined; and it consists in mechanism whereby an adjustable land-wheel may be utilized as a drive-wheel for the drill mechanism, in means for throwing the said mechanism into and out of gear, and in means for carrying a subsoil-plow out of operation faster than the lister-plow, so as to lift it above obstructions in traveling.

In the drawings, Figure 1 is a perspective view of the combined plow and planter, looking from the rear toward the front. Fig. 2 is a detail view of the eccentric bearing for the planter drive-shaft and adjacent parts. Fig. 3 is a perspective view of the frame, crank-axle, and driving-gear and adjacent parts removed from the rest of the machine.

The beam or frame A, the main crank-axle B, carrying the land-wheel C, the front furrow-wheel, D, provided with the upright crank-axle connected directly to the pole, the rear furrow-wheel, E, the adjustable double mold-board plow F, the subsoil-plow G, and the corn-drill H form in themselves no part of the present invention, and, being of known construction, no detailed description will be given.

To the hub of the wheel C is secured, in any suitable manner, a gear-wheel, I, meshing with a pinion, K, on one end of a short shaft, L, the other end of the shaft carrying a bevel-pinion, M. The shaft L is mounted in suitable bearings in one end of a casting, N, the other end of which is arched to pass over and protect the pinion M, and is firmly bolted or otherwise secured to the frame A in such a manner that the shaft L will be in line with the main portion of the axle B. It is evident that this construction will admit of the ground-wheel being adjusted in the usual manner without throwing the wheel I and pinion K out of gear.

Near the rear end of the frame A is secured the hopper O of a corn-drill, which may be of any approved construction, and is preferably provided with the usual revolving perforated feeding-plates carried by a bevel gear-wheel, P.

The wheel P meshes with a bevel-pinion, R, on one end of a drive-shaft, S, journaled in bearings attached to the frame A, and at the other end, adjacent to the casting N, provided with a bevel-pinion, T, meshing with the pinion M on the shaft L.

The forward bearing for the shaft S consists of an eccentric, U, supported on the casting N, and having a side continuation arranged to be moved by the foot of the driver to throw the pinions M and R into or out of gear to start or stop the drill.

The subsoil-plow G is provided with a standard, V, the upper end of which is bent backward and bifurcated, and is pivoted to a post or plate, W, depending from the frame A. A lever, X, is also pivoted to the plate W and to the plow F, and is connected at the rear end by a link, Y, to the rear end of the standard V. The connections between the plows F and G are such that as the former is lifted in the usual manner the latter will be lifted by the connections above described, but at a faster rate, and closes up out of the way of obstructions in traveling and when not required. The plate W and link Y are provided with perforations, so that the lever X may be set at any desired point.

The delivery-tube Z from the hopper extends downward to near the ground, and is preferably secured to the rear of the subsoil-plow by an eye or like means, which will permit it to conform to the movement of the plow when raised or lowered into working position.

The rear furrow-wheel is constructed with a broad tire and placed directly behind the subsoil-plow, so as to operate as a coverer.

The invention is not confined to the exact construction and arrangement of parts shown, as, for instance, sprocket-wheels and chain may be substituted for the gear I and K. Any connections between the land-wheel and planting mechanism which will admit of the adjustment of the land-wheel may be employed, and other connections may be used between the two plows, it only being necessary that the subsoil-plow be lifted at a faster rate than the double-mold-board plow.

It is evident that the planting mechanism and lister-plow in no way interfere with the use of the machine as a sulky-plow, the parts being readily removed and replaced by others when desired.

Having described my invention, what I claim is—

1. In a combined plow and planter, the combination, with the adjustable land-wheel and crank-axle therefor, of a shaft in line with the axle and adjacent to the said wheel, a planting mechanism on the plow-frame, a drive-shaft extending from the first-mentioned shaft to the planting mechanism, and connections between the land-wheel and the shaft adjacent thereto, whereby the said land-wheel may be adjusted without affecting the said connections, substantially as described.

2. In a combined plow and planter, the combination, with the drive-wheel, of a planting mechanism, a drive-shaft connected therewith, connections between the said drive-shaft and the drive-wheel, and an eccentric bearing for the said shaft, whereby it may be thrown into and out of gear with the connections to the drive-wheel.

3. In a combined plow and planter, the combination, with the double mold-board plow, of a pivoted subsoil-plow at the rear of the same, a pivoted lever connected to the front plow, and connections between the lever and subsoil-plow, whereby the latter is moved up and down faster than the front plow, substantially as described.

4. In a combined plow and planter, the plow-carrying frame, the crank-axle, and the land-wheel carried by the axle, in combination with a wheel, K, driven directly from the land-wheel and having its axis coincident with the axis of the crank-axle, a seeding mechanism on the frame, and connections, substantially as described, for driving said mechanism from the wheel K, whereby the plow may be adjusted to different depths without affecting the action of the seeder.

In testimony whereof I hereunto set my hand, this 25th day of July, 1887, in the presence of two attesting witnesses.

AUGUST LINDGREN.

Witnesses:
SOL. HIRSCH,
O. F. ANDERSON.